United States Patent
Kohli et al.

(10) Patent No.: US 10,676,389 B2
(45) Date of Patent: Jun. 9, 2020

(54) GLASS ARTICLE WITH HIGH COEFFICIENT OF THERMAL EXPANSION

(71) Applicant: Corning Incorporated, Corning, NY (US)

(72) Inventors: Jeffrey Todd Kohli, Corning, NY (US); Ronald Leroy Stewart, Fisherville, VA (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 15/759,694

(22) PCT Filed: Sep. 29, 2016

(86) PCT No.: PCT/US2016/054321
§ 371 (c)(1),
(2) Date: Mar. 13, 2018

(87) PCT Pub. No.: WO2017/059001
PCT Pub. Date: Apr. 6, 2017

(65) Prior Publication Data
US 2019/0039942 A1 Feb. 7, 2019

Related U.S. Application Data

(60) Provisional application No. 62/234,119, filed on Sep. 29, 2015.

(51) Int. Cl.
*C03C 3/087* (2006.01)
(52) U.S. Cl.
CPC .................... *C03C 3/087* (2013.01)

(58) Field of Classification Search
CPC ........................................ C03C 3/087
See application file for complete search history.

(56) References Cited

U.S. PATENT DOCUMENTS

| | | | |
|---|---|---|---|
| 5,618,763 A * | 4/1997 | Frank | C03C 3/085 |
| | | | 106/35 |
| 5,633,090 A | 5/1997 | Rodek et al. | |
| 5,854,153 A | 12/1998 | Kohli | |
| 6,430,966 B1 | 8/2002 | Meinhardt et al. | |
| 6,444,598 B1 | 9/2002 | Kawakami et al. | |
| 2003/0050173 A1 | 3/2003 | Lin | |
| 2009/0214923 A1* | 8/2009 | Takahashi | B01D 53/228 |
| | | | 429/500 |

FOREIGN PATENT DOCUMENTS

| | | |
|---|---|---|
| EP | 695726 B1 | 7/2003 |
| GB | 1398125 A | 6/1975 |
| JP | 5058671 A | 3/1993 |

OTHER PUBLICATIONS

International Search Report and Written Opinion of the International Searching Authority; PCT/US2016/054321 dated Dec. 23, 2016; 13 Pages; European Patent Office.

* cited by examiner

*Primary Examiner* — Elizabeth A. Bolden
(74) *Attorney, Agent, or Firm* — Amy T. Lang; John P. McGroarty

(57) ABSTRACT

A glass article includes an alkali-alkaline-alumino-silicate composition, wherein the glass article has a coefficient of thermal expansion (CTE) in a range from about $110 \times 10^{-7}/°$C. to about $130 \times 10^{-7}/°$C. over a temperature range of 0-300° C.

14 Claims, No Drawings

GLASS ARTICLE WITH HIGH COEFFICIENT OF THERMAL EXPANSION

CROSS-REFERENCE TO RELATED APPLICATIONS

This application claims the benefit of priority under 35 U.S.C. § 371 of International Application No. PCT/US16/54321, filed on Sep. 29, 2016, which claims the benefit of priority to U.S. Provisional Application No. 62/234,119 filed on Sep. 29, 2015, the content of which is incorporated herein by reference in its entirety.

BACKGROUND

Field

The disclosure relates to a glass article with a high coefficient of thermal expansion (CTE) and more particularly to a high CTE glass article having an alkali-alkaline-alumino-silicate composition.

Technical Background

Glass has increasing use as a component in a variety of devices or in manufacturing processes. For example, glass can serve as a display panel or protective cover in electronic devices or can serve as a carrier substrate during manufacturing processes. Glass can also serve as a cap or enclosure for encapsulating or sealing a device, for example, to provide a controlled environment. The glass is often part of an assembly or device wherein the glass is adhered, bonded or otherwise attached (permanently or temporarily) to another material. The coefficient of thermal expansion (CTE) is often important if the assembly or device including the glass will be subject to changes in temperature where the glass and/or the material to which it is attached will expand or contract. In such instances, the CTE of the glass should approximately match that of the material to which it is attached to avoid cracking or damage to the glass and/or other material, as well as separation of the glass and other material.

There is a need for glasses with a relatively high CTE, for example about $110 \times 10^{-7}/°$ C. or higher over a range from 0-300° C. to be used in assemblies or devices where the glass is attached to or protects an article having such a high CTE. However, existing glasses with CTEs in this range contain large metal cations such as $Ba^{2+}$ and $Pb^{2+}$ that are toxic. A need exists for glass articles with a relatively high CTE that do not contain these toxic materials.

SUMMARY

In a first aspect, a glass article is provided that includes an alkali-alkaline-alumino-silicate composition, wherein the glass article has a coefficient of thermal expansion in a range from about $110 \times 10^{-7}/°$ C. to about $130 \times 10^{-7}/°$ C. over a temperature range of 0-300° C.

In a second aspect according to the first aspect, the alkali-alkaline-alumino-silicate composition may include:
about 47 mol % to about 55 mol % $SiO_2$;
about 5 mol % to about 11 mol % $Al_2O_3$;
about 12 mol % to about 18 mol % $Na_2O$;
about 5 mol % to about 11 mol % $K_2O$;
about 13 mol % to about 21 mol % CaO; and
0 mol % to about 0.4 mol % MgO.

In a third aspect according to the first aspect, the alkali-alkaline-alumino-silicate composition may include:
about 48 mol % to about 54 mol % $SiO_2$;
about 6 mol % to about 10 mol % $Al_2O_3$;
about 13 mol % to about 17 mol % $Na_2O$;
about 6 mol % to about 10 mol % $K_2O$;
about 15 mol % to about 19 mol % CaO; and
about 0.05 mol % to about 0.3 mol % MgO.

In a fourth aspect according to any one of the first through third aspects, wherein the (CTE) is in a range from about $115 \times 10^{-7}/°$ C. to about $130 \times 10^{-7}/°$ C. over a temperature range of 0-300° C.

In a fifth aspect according to any one of the first through third aspects, wherein the (CTE) is in a range from about $120 \times 10^{-7}/°$ C. to about $130 \times 10^{-7}/°$ C. over a temperature range of 0-300° C.

In a sixth aspect according to any one of the first through fifth aspects, wherein the alkali-alkaline-alumino-silicate composition includes less than about 1 mol % $SnO_2$.

In a seventh aspect according to any one of the first through sixth aspects, wherein an alkali component of the alkali-alkaline-alumino-silicate composition is $Na_2O$, $K_2O$, or a combination thereof.

In an eight aspect according to any one of the first through seventh aspects, wherein the article is a substrate.

In a ninth aspect according to any one of the first through seventh aspects, wherein the article is a cap.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

The following description is provided as an enabling teaching. To this end, those skilled in the relevant art will recognize and appreciate that many changes can be made to the various embodiments described herein, while still obtaining the beneficial results. It will also be apparent that some of the desired benefits can be obtained by selecting some of the features without utilizing other features. Accordingly, those who work in the art will recognize that many modifications and adaptations to the present embodiments are possible and can even be desirable in certain circumstances and are a part of the present description. Thus, the following description is provided as illustrative and should not be construed as limiting.

Disclosed herein is a glass article having an alkali-alkaline-alumino-silicate composition with a CTE of about $110 \times 10^{-7}/°$ C. or higher over a temperature range of 0-300° C.

In some embodiments, the glass may include $SiO_2$, $Al_2O_3$, $Na_2O$, $K_2O$, CaO, and MgO. The interplay between the amounts of the different oxides in the composition affect the properties of the glass article including, but not limited to, CTE, chemical durability, melting and forming temperatures, dielectric behavior and weathering characteristics. In some embodiments, the glass may include, on an oxide basis:

about 47 mol % to about 55 mol % $SiO_2$;
about 5 mol % to about 11 mol % $Al_2O_3$;
about 12 mol % to about 18 mol % $Na_2O$;
about 5 mol % to about 11 mol % $K_2O$;
about 13 mol % to about 21 mol % CaO; and
0 mol % to about 0.4 mol % MgO.

In other embodiments, the glass may include, on an oxide basis:

about 48 mol % to about 54 mol % $SiO_2$;
about 6 mol % to about 10 mol % $Al_2O_3$;
about 13 mol % to about 17 mol % $Na_2O$;
about 6 mol % to about 10 mol % $K_2O$;
about 15 mol % to about 19 mol % CaO; and
about 0.05 mol % to about 0.3 mol % MgO.

In some embodiments, $SiO_2$ may be used as the primary glass former. Increasing $SiO_2$ content generally improves chemical durability, but raises the melting and forming temperatures of the glass. In some embodiments, the composition of the glass article may have from about 47 mol % to about 55 mol % or about 48 mol % to about 54% $SiO_2$.

$Al_2O_3$ content can affect the properties of the glass in that an increase in $Al_2O_3$ content increases chemical durability, but CTE decreases and melting and forming temperatures increase. In some embodiments, the composition of the glass article may have from about 5 mol % to about 11 mol % or about 6 mol % to about 10 mol % $Al_2O_3$.

Alkali metal content, such as from $Na_2O$ and $K_2O$, affects the CTE of the glass in that an increase in the alkali content increases the CTE. In some embodiments, the composition of the glass article may have from about 12 mol % to about 18 mol % or about 13 mol % to about 17 mol % $Na_2O$. In some embodiments, the composition of the glass article may have from about 5 mol % to about 11 mol % or about 6 mol % to about 10 mol % $K_2O$. In some embodiments, toxic alkalis such as barium are not included in the glass. Thus, in some embodiments, an alkali component of the alkali-alkaline-alumino-silicate composition is $Na_2O$, $K_2O$, or a combination thereof.

Alkaline metal content, such as from CaO and MgO, may be added to limit alkali mobility and to flux the glass melt at high temperatures to provide enhanced chemical durability. In some embodiments, the composition of the glass article may have from about 13 mol % to about 21 mol % or about 15 mol % to about 19 mol % CaO. In some embodiments, the composition of the glass article may have from 0 mol % to about 0.4 mol % or about 0.05 mol % to about 0.3 mol % MgO.

In some embodiments, the glass article may also include a fining agent, for example $SnO_2$. In such embodiments, the composition of the glass article may have less than about 1 mol % or less than about 0.5 mol % $SnO_2$.

In some embodiments, the glass article may have a CTE in a range from about $110\times10^{-7}/°$ C. to about $130\times10^{-7}/°$ C., about $110\times10^{-7}/°$ C. to about $125\times10^{-7}/°$ C., about $110\times10^{-7}/°$ C. to about $120\times10^{-7}/°$ C., about $110\times10^{-7}/°$ C. to about $115\times10^{-7}/°$ C., about $115\times10^{-7}/°$ C. to about $130\times10^{-7}/°$ C., about $115\times10^{-7}/°$ C. to about $125\times10^{-7}/°$ C., about $115\times10^{-7}/°$ C. to about $120\times10^{-7}/°$ C., about $120\times10^{-7}/°$ C. to about $130\times10^{-7}/°$ C., about $120\times10^{-7}/°$ C. to about $125\times10^{-7}/°$ C., or about $125\times10^{-7}/°$ C. to about $130\times10^{-7}/°$ C. over a temperature range of 0-300° C. In some embodiments, the glass may have a CTE of about $110\times10^{-7}/°$ C. or higher, about $115\times10^{-7}/°$ C. or higher, about $120\times10^{-7}/°$ C. or higher, or about $125\times10^{-7}/°$ C. or higher over a temperature range of 0-300° C. The CTE may be measured using a push-rod dilatometer in accordance with ASTM E228-11.

In some embodiments, the glass article is chemically durable. Chemical durability may be measured in terms of acid durability or base durability. Acid durability may be measured in terms of weight loss measurements to a glass article subjected to a 5 wt % HCl solution at 95° C. for 24 hours. Base durability may be measured in terms of weight loss measurements to a glass article subjected to a 5 wt % NaOH solution at 95° C. for 6 hours. In some embodiments, the acid durability of the glass article is a weight loss of less than about 0.02 mg/cm². In some embodiments, the base durability of the glass article is a weight loss of less than about 0.3 mg/cm².

In some embodiments, the glass article has acceptable weathering characteristics. Weathering characteristics may be determined by exposing the glass article in a humidity chamber held at 60° C. and 90% relative humidity for 72 hours. A glass with acceptable weathering characteristics has relatively few spots and minimal haze.

The glass article may be made into a variety of forms. For example, the glass article may be a flat substrate in the shape of a square, rectangle, or wafer. Also, for example, the glass article may be formed, machined, or polished to a desired shape, for example a cap or curved shape.

Example

Nine glass samples of varying compositions were formed and the CTE of each sample was measured. The composition and CTE of each sample are listed in Table 1 below.

TABLE 1

| Sample | 1 | 2 | 3 | 4 | 5 | 6 |
|---|---|---|---|---|---|---|
| $SiO_2$ mol % | 50.78 | 50.45 | 51.72 | 51.56 | 51.02 | 50.72 |
| $Al_2O_3$ mol % | 11.31 | 11.05 | 9.94 | 9.25 | 8.83 | 7.87 |
| $Na_2O$ mol % | 12.76 | 13.82 | 13.83 | 15.01 | 15.47 | 15.69 |
| $K_2O$ mol % | 5.72 | 5.73 | 6.18 | 6.53 | 6.99 | 8.1 |
| CaO mol % | 19.16 | 18.68 | 18.08 | 17.4 | 17.45 | 17.34 |
| MgO mol % | 0.16 | 0.16 | 0.15 | 0.15 | 0.15 | 0.18 |
| $SnO_2$ mol % | 0.11 | 0.1 | 0.1 | 0.1 | 0.09 | 0.1 |
| CTE ($\times10^{-7}/°$ C. T range 0-300° C.) | 110.4 | 112.8 | 112.1 | 115.6 | 117.2 | 126.8 |

Table 1 demonstrates that a glass article with a CTE in a range from about $110\times10^{-7}/°$ C. to about $130\times10^{-7}/°$ C. over a temperature range of 0-300° C. can be achieved with a composition of about 47 mol % to about 55 mol % $SiO_2$;
about 5 mol % to about 11 mol % $Al_2O_3$;
about 12 mol % to about 18 mol % $Na_2O$;
about 5 mol % to about 11 mol % $K_2O$;
about 13 mol % to about 21 mol % CaO; and
0 mol % to about 0.4 mol % MgO.

It is noted that the term "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Various modifications and variations can be made to the embodiments described herein without departing from the scope of the claimed subject matter. Thus it is intended that the specification cover the modifications and variations of the various embodiments described herein provided such modification and variations come within the scope of the appended claims and their equivalents.

What is claimed is:

1. A glass article comprising an alkali-alkaline-alumino-silicate composition, wherein the glass article has a coefficient of thermal expansion (CTE) in a range from $110\times10^{-7}/°$ C. to $130\times10^{-7}/°$ C. over a temperature range of 0-300° C., and
wherein the alkali-alkaline-alumino-silicate composition comprises:
47 mol % to 55 mol % $SiO_2$;
5 mol % to 11 mol % $Al_2O_3$;
12 mol % to 18 mol % $Na_2O$;
5 mol % to 11 mol % $K_2O$;
13 mol % to 21 mol % CaO; and
0 mol % to 0.4 mol % MgO.

2. The glass article of claim 1, wherein the alkali-alkaline-alumino-silicate composition comprises less than 1 mol % $SnO_2$.

3. The glass article of claim 1, wherein the CTE is in a range from $115\times10^{-7}/°$ C. to $130\times10^{-7}/°$ C. over a temperature range of 0-300° C.

4. The glass article of claim 1, wherein the CTE is in a range from $120\times10^{-7}/°$ C. to $130\times10^{-7}/°$ C. over a temperature range of 0-300° C.

5. The glass article of claim 1, wherein the article is a substrate.

6. The glass article of claim 1, wherein the article is a cap.

7. The glass article of claim 1, wherein the alkali-alkaline-alumino-silicate composition comprises:
48 mol % to 54 mol % $SiO_2$;
6 mol % to 10 mol % $Al_2O_3$;
13 mol % to 17 mol % $Na_2O$;
6 mol % to 10 mol % $K_2O$;
15 mol % to 19 mol % CaO; and
0.05 mol % to 0.3 mol % MgO.

8. The glass article of claim 7, wherein the alkali-alkaline-alumino-silicate composition further comprises less than 1 mol % $SnO_2$.

9. The glass article of claim 7, wherein the CTE is in a range from $115\times10^{-7}/°$ C. to $130\times10^{-7}/°$ C. over a temperature range of 0-300° C.

10. The glass article of claim 7, wherein the CTE is in a range from $120\times10^{-7}/°$ C. to $130\times10^{-7}/°$ C. over a temperature range of 0-300° C.

11. A glass article comprising an alkali-alkaline-alumino-silicate composition, wherein the glass article has a coefficient of thermal expansion (CTE) in a range from $110\times10^{-7}/°$ C. to $130\times10^{-7}/°$ C. over a temperature range of 0-300° C., wherein the alkali-alkaline-alumino-silicate composition does not comprise barium, and wherein the alkali-alkaline-alumino-silicate composition comprises:
47 mol % to 55 mol % $SiO_2$;
5 mol % to 11 mol % $Al_2O_3$;
12 mol % to 18 mol % $Na_2O$;
5 mol % to 11 mol % $K_2O$;
13 mol % to 21 mol % CaO; and
0 mol % to 0.4 mol % MgO.

12. The glass article of claim 11, wherein the CTE is in a range from $115\times10^{-7}/°$ C. to $130\times10^{-7}/°$ C. over a temperature range of 0-300° C.

13. The glass article of claim 11, wherein the CTE is in a range from $120\times10^{-7}/°$ C. to $130\times10^{-7}/°$ C. over a temperature range of 0-300° C.

14. The glass article of claim 11, wherein the alkali-alkaline-alumino-silicate composition comprises less than 1 mol % $SnO_2$.

* * * * *

UNITED STATES PATENT AND TRADEMARK OFFICE
CERTIFICATE OF CORRECTION

PATENT NO. : 10,676,389 B2  
APPLICATION NO. : 15/759694  
DATED : June 9, 2020  
INVENTOR(S) : Jeffrey Todd Kohli et al.

Page 1 of 1

It is certified that error appears in the above-identified patent and that said Letters Patent is hereby corrected as shown below:

In the Claims

In Column 6, Line 29, Claim 13, delete "The glass article of" and insert -- The glass article of claim --, therefor.

Signed and Sealed this  
Twenty-second Day of September, 2020

Andrei Iancu  
*Director of the United States Patent and Trademark Office*